US010729108B2

(12) United States Patent
Tolley (10) Patent No.: US 10,729,108 B2
(45) Date of Patent: *Aug. 4, 2020

(54) ANIMAL RELOCATION SYSTEM AND METHOD

(71) Applicant: Safe Haven Wildlife Removal and Property Management Experts, LLC, Winston-Salem, NC (US)

(72) Inventor: Derek L. Tolley, Winston-Salem, NC (US)

(73) Assignee: Safe Haven Wildlife Removal and Property Management Experts, LLC, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,664

(22) Filed: Nov. 22, 2019

(65) Prior Publication Data

US 2020/0085020 A1    Mar. 19, 2020

Related U.S. Application Data

(63) Continuation of application No. 16/297,820, filed on Mar. 11, 2019, which is a continuation of application No. 15/159,733, filed on May 19, 2016, now Pat. No. 10,251,374.

(51) Int. Cl.
| | | |
|---|---|---|
| *A01K 23/00* | (2006.01) | |
| *A01K 37/00* | (2006.01) | |
| *A01K 45/00* | (2006.01) | |
| *B25G 1/04* | (2006.01) | |

(52) U.S. Cl.
CPC .............. *A01K 45/005* (2013.01); *B25G 1/04* (2013.01)

(58) Field of Classification Search
CPC ...... A01K 45/005; A01K 29/00; A01K 37/00; A01M 23/00; A01M 23/02; A01M 23/12; B25G 1/04
USPC ........................ 119/717, 339, 340; 43/58, 60
See application file for complete search history.

(56) References Cited

U.S. PATENT DOCUMENTS

| | | | |
|---|---|---|---|
| 102,761 A | 5/1870 | Brooks | |
| 234,004 A | 11/1880 | Dolley | |
| 433,241 A | 7/1890 | Hawkins, Jr. | |
| 1,479,889 A | 1/1924 | Brown | |
| 1,612,608 A | 12/1926 | Chamberlin | |
| 1,765,144 A | 6/1930 | Gibbs | |
| 1,816,269 A | 7/1931 | Topp | |
| 2,839,867 A | 6/1958 | Knutsen | |
| 3,450,100 A * | 6/1969 | Cuculic | A01K 1/0029 119/441 |
| 4,791,753 A | 12/1988 | Fuhrman | |
| 5,966,862 A | 10/1999 | Ueno | |
| 6,732,471 B2 | 5/2004 | Draper | |
| 9,943,073 B2 | 4/2018 | Brugh | |
| 10,154,663 B2 | 12/2018 | Brugh | |

(Continued)

OTHER PUBLICATIONS

Bird B Gone, In. "Mist Netting/Capture Kit Instructions".
Bird Barrier "Mist Net Kits," http://www.birdbarrier.com/category/090MNK/nnist-nets-kits.

*Primary Examiner* — Trinh T Nguyen
(74) *Attorney, Agent, or Firm* — Massey Law, PLLC (57) ABSTRACT

An animal relocation system and method comprising a perimeter net system a trapping net system, and a flushing device, wherein the flushing device channels the animal through the perimeter net system and into the trapping net.

17 Claims, 7 Drawing Sheets

(56) References Cited

U.S. PATENT DOCUMENTS

| | | |
|---|---|---|
| 10,251,374 B2 | 4/2019 | Tolley |
| 2005/0166441 A1 | 8/2005 | Mattox |

* cited by examiner

ANIMAL RELOCATION SYSTEM AND METHOD

CROSS-RELATION TO RELATED APPLICATION

This application is a continuation of U.S. application Ser. No. 16/297,820 filed May Mar. 11, 2019, which is itself a continuation of U.S. application Ser. No. 15/159,733 filed May 19, 2016, now U.S. Pat. No. 10,251,374, each of which is hereby incorporated by reference in their entirety.

BACKGROUND OF THE INVENTION

Field of the Invention

This invention relates to a system and method of animal relocation. More specifically, this invention relates to a system and method of animal relocation for animals located inside an enclosed structure using a net system and various flushing techniques.

Description of the Background Art

Any place of business that sells food or medicine has an interest in preventing wildlife from entering and either eating its goods or contaminating its goods. Such contamination can have serious health implications for the business' customers. Similarly, there are FDA programs, such as the Retail Food Safety Initiative, and local health department requirements in place to reduce the amount of foodborne illness in this country.

Animals such as birds tend to search for areas to roost that are high up and away from predators. The rafters of big box stores, warehouses, and other structures containing exposed support beams provide areas inside of those types of structures that make for preferred bird roosting areas. Birds may also take up residence in buildings with drop ceilings. However, the presence of a bird inside the structure interferes with the welfare of the food and medicine inside these structures which necessitates removal of the bird. These structures can have large footprints that can range from a couple thousand to over a million square feet. Without the proper technique, it could take several hours or even days to remove a bird from the structure.

There are many known techniques used to capture birds. Traps contain the possibility of harming the bird and all efforts should be made when capturing a wild animal to produce the least amount of harm. Using loud noises or impersonating the bird's natural predators may also scare the bird into leaving if the overall area is small enough; otherwise, the bird will simply move to another roost and continue troubling the structure. Nets, such as mist nets, remove a large chance of harming the animal but it can be difficult to get the bird into the net without considerable effort. The present system and method describe a technique using nets that quickly and painlessly results in the capture of a bird stuck inside a structure.

Different species of birds that tend to enter structures include sparrows, wren, starlings, mockingbirds, and finches, among others. Each species of bird has different flight and personality characteristics. Sparrows can be aggressive and can appear in groups. Wrens tend to run in pairs and stay low, generally on the floor, as they are not accustomed to being in high places unless there is cover. Starlings are carnivores, meaning they tend to stay near packaged meat when indoors, and are smart problem solvers with great vision who can identify nets. Mockingbirds eat fruit and have simple flight paths but are not afraid of humans or other species. Finches are extremely difficult to catch because they have great eyesight and can stop full flight in midair while looking for a way out or hiding spot. Each bird has its own idiosyncrasies and requires individual handling. The present system and method provides a streamlined approach to make it easier to catch any type of bird residing within an enclosed structure.

It is an object of this invention to provide an improvement which overcomes the aforementioned inadequacies of prior methods and provides an improvement which is a significant contribution to the advancement of bird relocation art.

Another object of this invention is to provide a system and method for relocating birds residing within a structure.

Another object of this invention is to provide a system and method for relocating birds which will greatly reduce the likelihood of harm that could be inflicted on the bird.

Another object of this invention is to provide a system and method for relocating birds which greatly reduces the time it takes to remove a bird from a large enclosed structure.

Another object of this invention is to provide a system and method for relocating birds to increase compliance with Food and Drug Administration food safety regulations and reduce the health hazards associated with wild birds.

Another object of this invention is to provide a conservation-sensitive bird relocation system and method.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an animal relocation system and method comprising at least one enclosed building, an animal, at least one perimeter net system comprising between one and two nets and further comprising, a first telescoping pole having a first end and a second end, the first end of the telescoping pole having a hook, at least one removable connector attached to the hook, a plurality of connectors attaching a net having a first net side and a second net side to a rope and a pulley at the first net side, the rope and pulley connected to a support and a support beam by a cleat, a second telescoping pole having a first end and a second end connected to the first telescoping pole by a plurality of connectors attached to the net, and at least one trapping net system further comprising between one and three nets arranged to force the animal into the perimeter net system through use of a flushing device.

The disclosed system and method has several important advantages. For example, the disclosed system and method allows for the humane retrieval and relocation of birds within an enclosed structure. This system and method also greatly reduces the time necessary to relocate the bird.

Another advantage is that the disclosed system and method can be modified based on the size of the enclosed building where the animal is located.

Another advantage is that the disclosed system and method can be used in buildings as large as one million square feet or larger.

Another advantage is that the disclosed system and method essentially cuts the area inside an enclosure needed to capture an animal by half.

Another advantage is that the disclosed system and method reduces the time necessary to capture and release an animal inside and enclosed building.

Another advantage is that the disclosed system and method can be modified based on the animal currently in the enclosed building since different animals have different movement tendencies.

Another advantage is the disclosed system and method provides for an improved animal capture procedure whereby the space the animal could escape during an attempted capture is greatly lessened due to the arrangement of the perimeter net system and trapping net system.

Another advantage is the disclosed system and method increases compliance with FDA food safety regulations in enclosures where said regulations apply.

Another advantage is the disclosed system and method reduces health hazards from animals being present in an enclosed building.

Another advantage is the disclosed system and method improves the security of food resources in those enclosed buildings where food is present.

Another advantage is the disclosed system and method is a humane conservation-sensitive animal removal technique.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
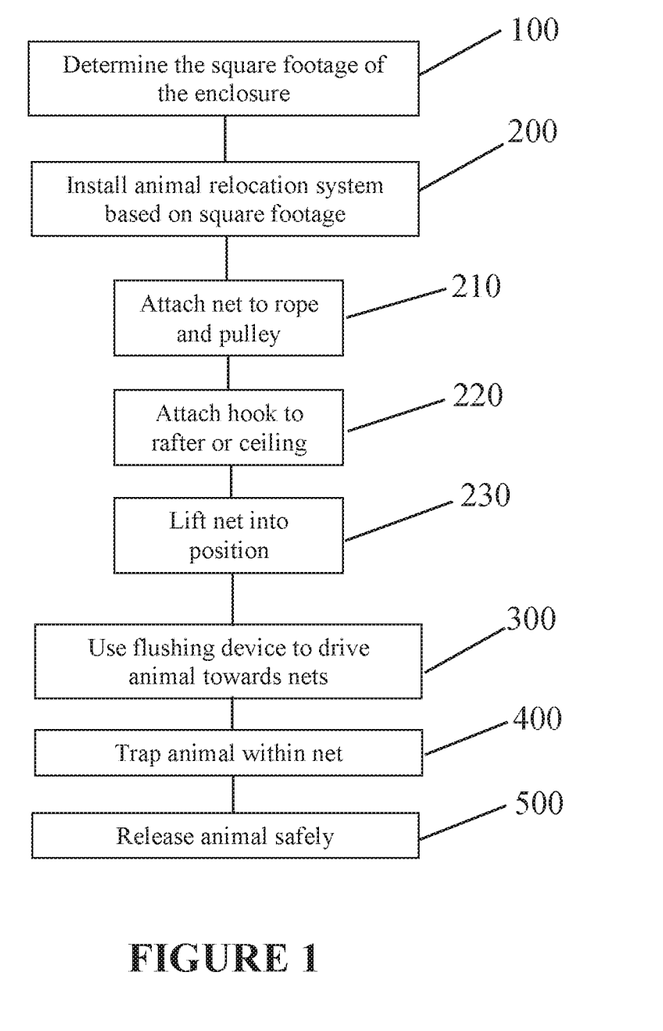
FIG. 1 is a flowchart showing the steps of the proposed method.

A animal relocation system 10 and method is shown in the flowchart of FIG. 1. The relocation system 10 comprises a perimeter net system 12 and a trapping net system 14. Each net system comprises at least one net 16 attached to a telescoping pole 18 ending at a distal end 20 with a hook 22. The hook has a removable connector 24 which connects a rope 26 and pulley 28 forming a rope and pulley system 30 having at least one connector 32 to connect the net 16 to the telescoping pole 18. The rope and pulley system 30 are secured to a support, preferably by a cleat or similar means.

The method generally comprises first determining the square footage of the enclosure 36 so the proper setup is installed 100, installing the perimeter net system 12 of the animal relocation system 10 based on the layout of the enclosure 36 and the square footage determination 200, installation generally comprising for each net 16 attaching the net 16 to the rope and pulley system 30 using the connectors 32, 210, attaching the hook 22 to a hanging member 40 or portion of ceiling 42, 220, and then lifting the net 16 into position 230, using a flushing device 46 to drive the animal 60 toward a net 16, 300, trapping the animal 60 within a net 16, 400, and then releasing the animal 60 to safety 500. The hanging member 40 can be a rafter, beam, truss, or other similar support.

Figure 2:
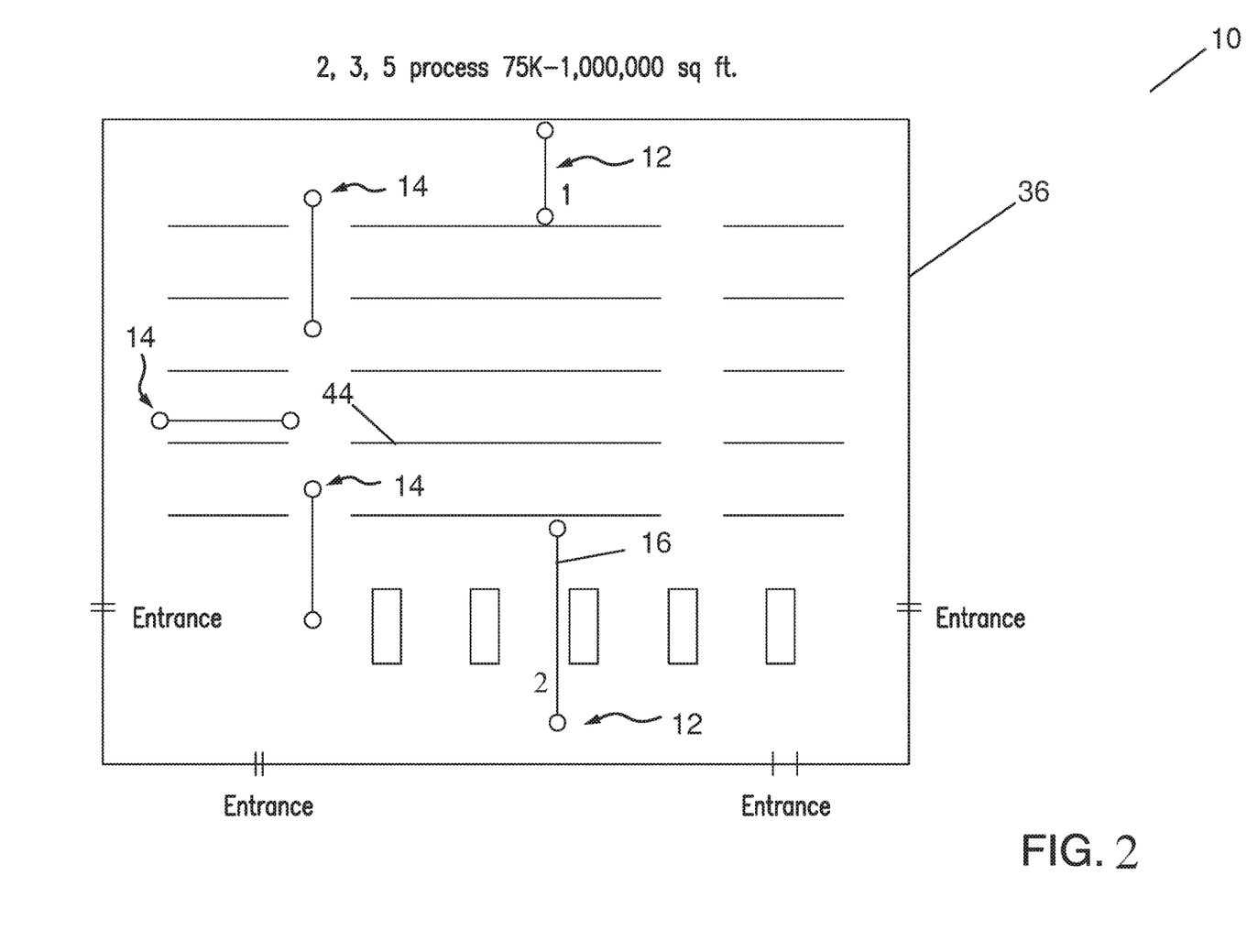
FIG. 2 is a layout of an enclosure employing the preferred net setup.

As seen in FIG. 2, an enclosure 36 over 75,000 square feet can use the setup disclosed. Preferably, the perimeter net system 12 is set up around the perimeter of the enclosure 36. The trapping net system 14 on the interior of the enclosure 36 so as to reduce the space the animal 60 can traverse while the capture attempt is occurring. This preferred setup is also known as the "2:3:5" system because of how the perimeter net system 12 and trapping net system 14 are setup. The setup is named "2:3:5" because it preferably uses two nets for the perimeter net system 12 and three nets for the trapping net system 14 for a total of five nets. By placing the perimeter net system 12 along the outer perimeter of the enclosure 36, the escape routes for the animal 60 are reduced and the animal 60 can be funneled into the trapping net system 14. The arrangement of the trapping net system 14 is customizable and modular for enclosures 36 of differing layouts.

Figure 3:
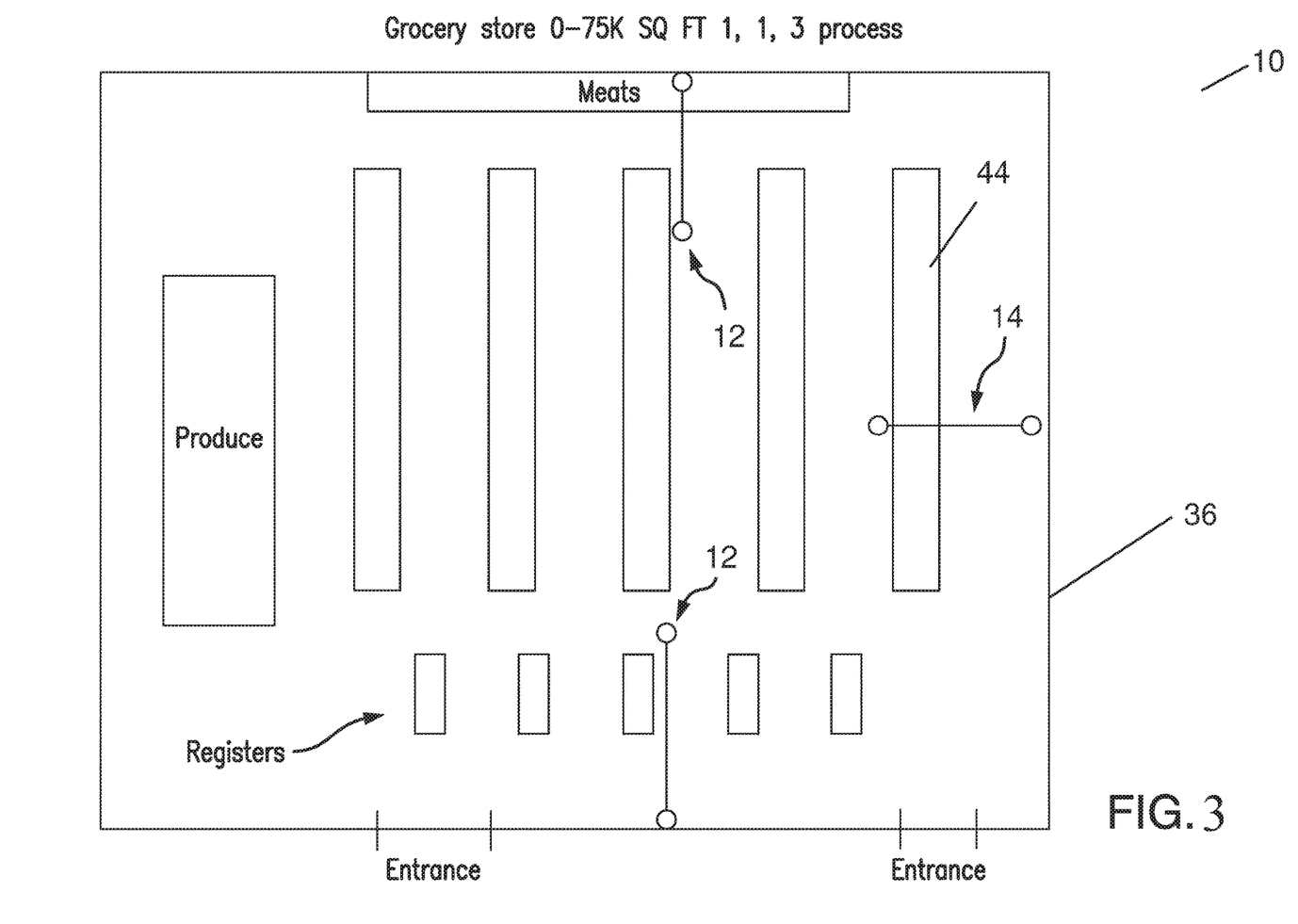
FIG. 3 is a layout of an enclosure employing an alternative net setup.

As seen in FIG. 3, an alternative setup can be used for an enclosure 36 less than 75,000 square feet. The perimeter net system 12 is again set up on the perimeter of the enclosure 36 and the trapping net system 14 is set up on one side of the enclosure 36 to again reduce the space the animal 60 can traverse while the capture attempt is occurring. This alternative setup is also known as the "1:1:3" system because of how the perimeter net system 12 and the trapping net system 14 are setup. More specifically, the "1:1:3" system has two nets 16 on the outer perimeter of the enclosure 36, with one net 16 on opposite sides of the enclosure 36, and one net 16 for the trapping net system 14 placed based on the layout of the enclosure 36 so as to efficiently capture the animal 60.

Figure 4:
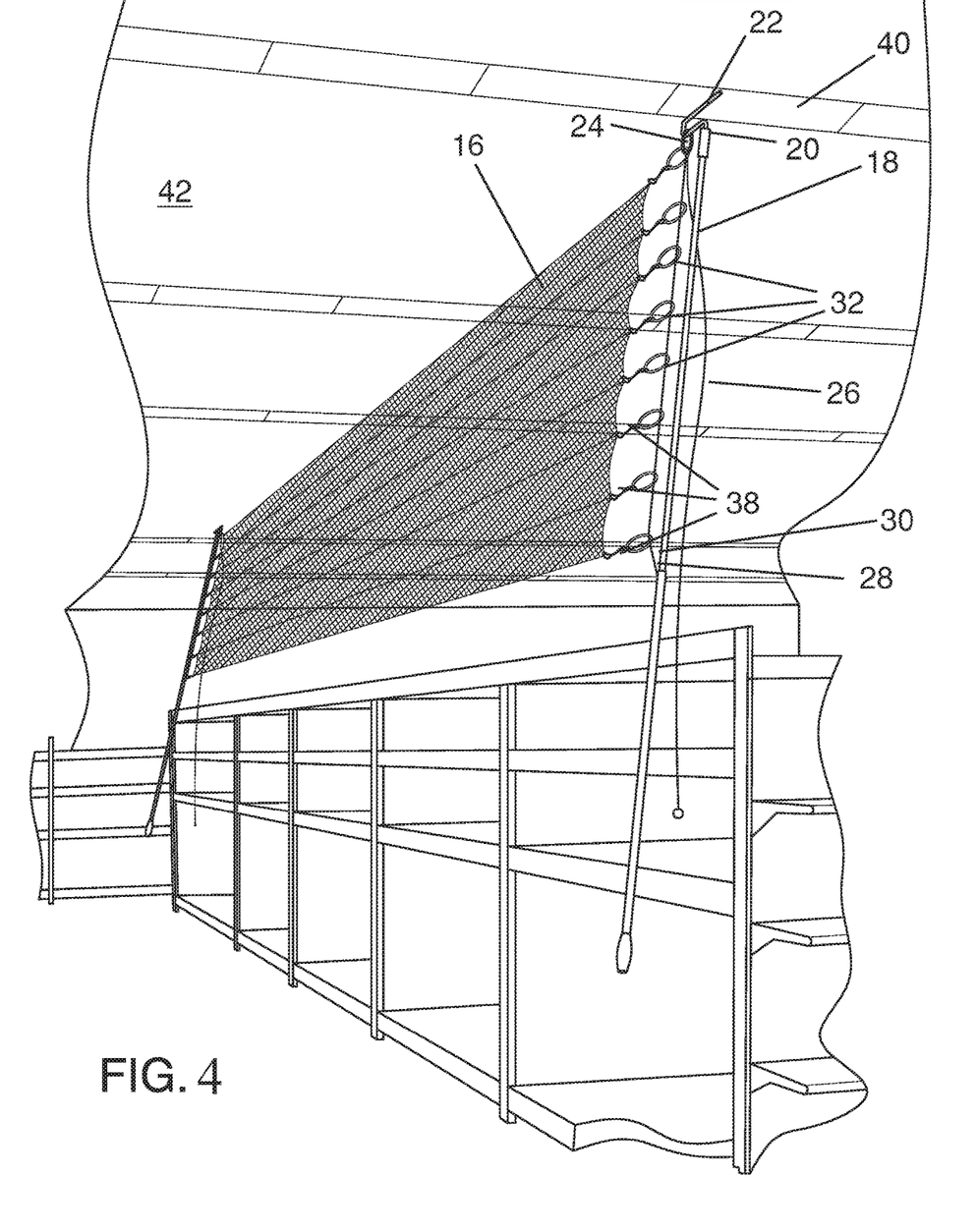
FIG. 4 is a perspective view of one of the nets used in the system.
Figure 5:
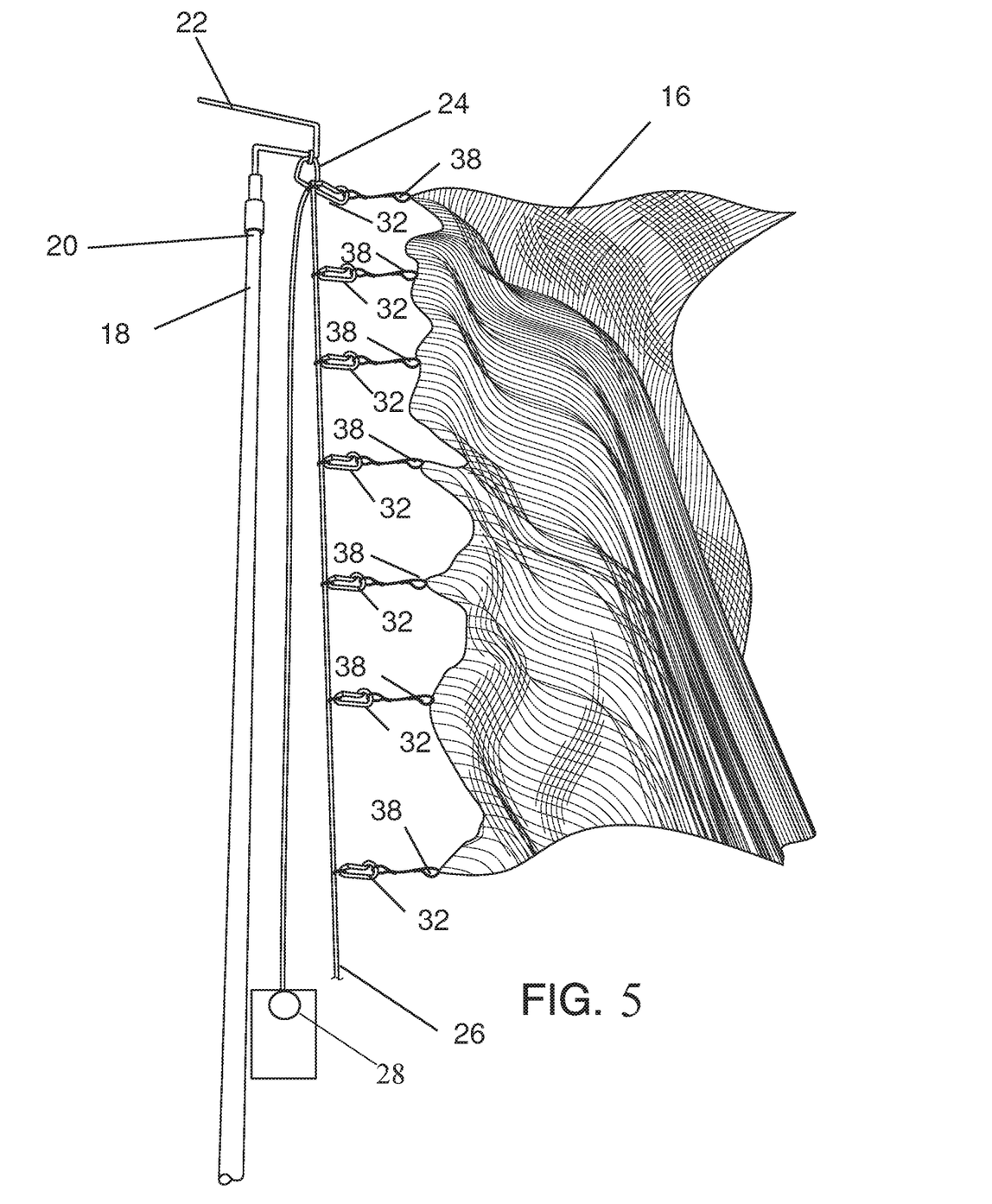
FIG. 5 is a close-up perspective view of the one of the nets used in the system

FIGS. 4 and 5 show one net 16, telescoping pole 18 and rope and pulley system 30 from either the perimeter net system 12 or the trapping net system 14 in more detail. The removable connector 24 and connectors 32 are preferably carabiners but may be any type of connection that allows for the easy removal and installation of the net 16. The net 16 has at least one fastener 38 to connect the net 16 to the rope 26 of the rope and pulley system 30. Preferably, the net 16 can be hung from a hanging member 40 or other portion of a ceiling 42 of the enclosure 36 sufficient to catch the hook 22. In the preferred embodiment, the net 16 can hang over a shelving unit 44 so that customers can still approach any goods stored thereon.

Figure 6:
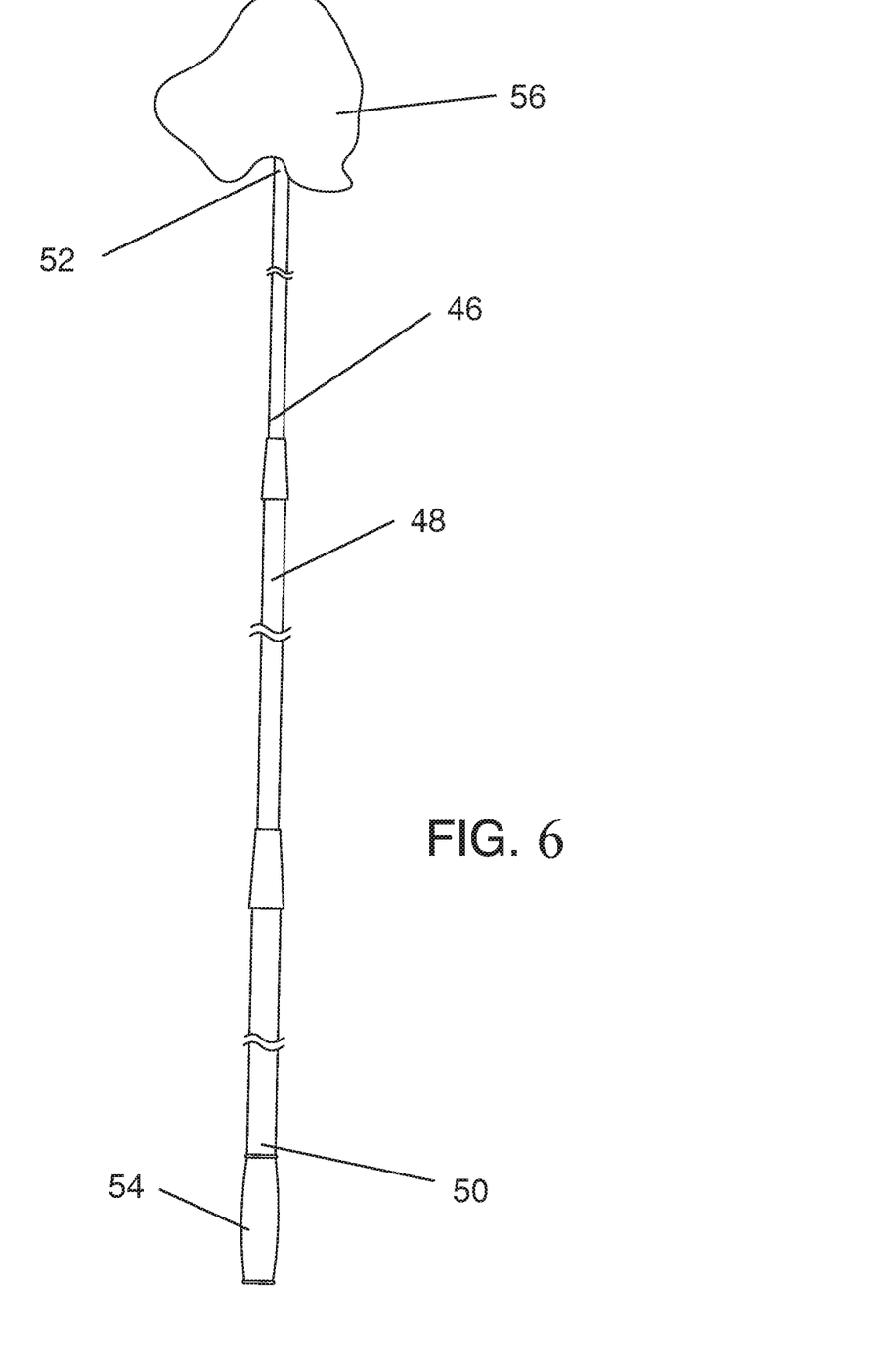
FIG. 6 is a front view of the flushing device.

FIG. 6 shows the flushing device 46. The flushing device comprises a telescoping arm 48 having a proximal end 50 and distal end 52. The proximal end 50 has a handle 54 and the distal end 52 has a flusher 56. The flusher 56 can be any object that, when shaken or moved, creates noise, movement, or both. The noise and/or movement can drive the animal 60 from a hiding spot into one of the nets 16. For example, a plastic bag, when attached to the flushing device 46 and shaken, can drive a bird from its roost into the open. It is preferred that the handler using the flushing device 46 keep the flushing device 46 at a 40 degree angle. This particular angle was chosen because it keeps the flushing device 46 in the animal's 60 line of sight while also remaining out of the way of the capture attempt.

Figure 7:
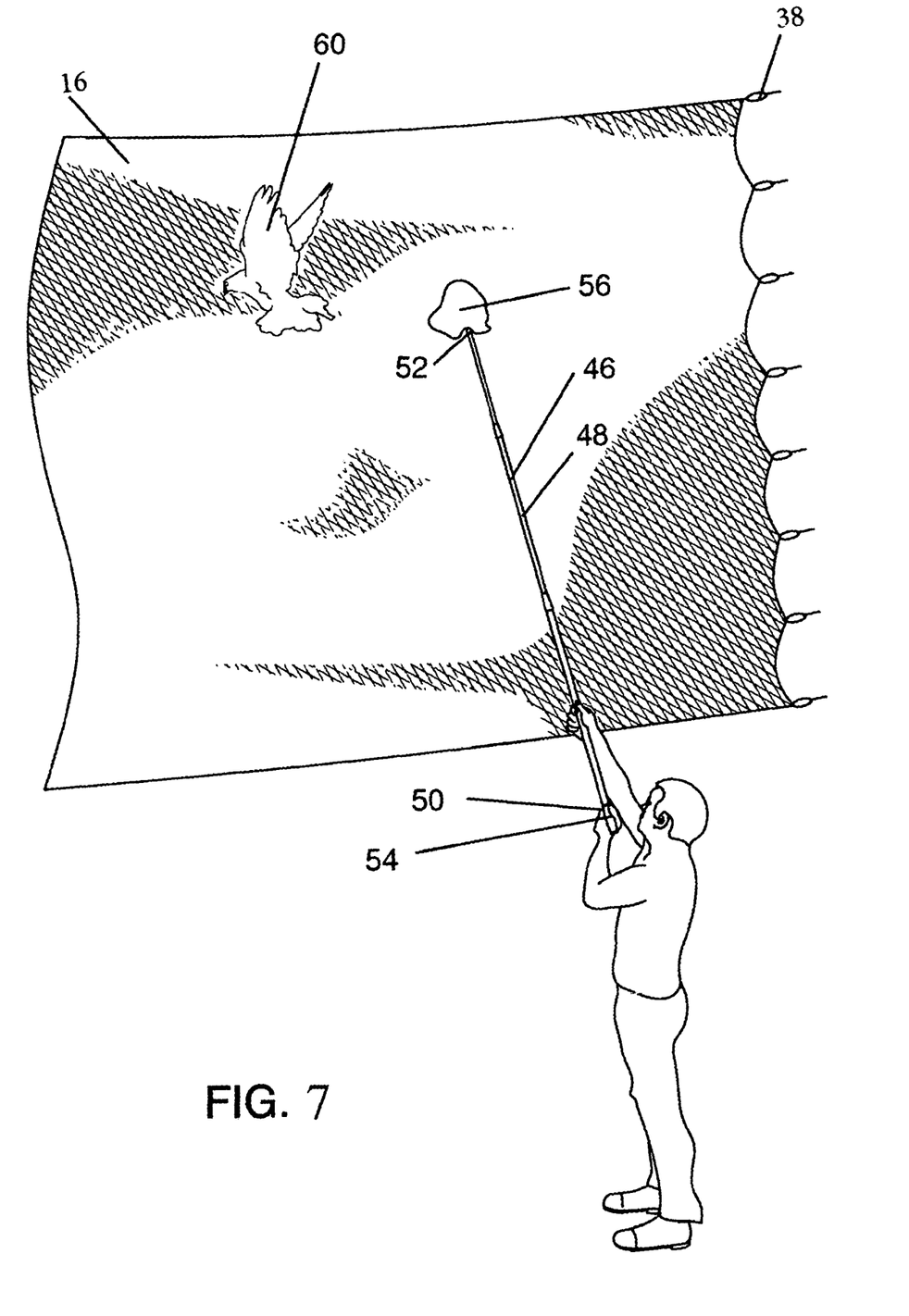
FIG. 7 is perspective view of a net as used in the system trapping an animal within an enclosure.

FIG. 7 shows the result of the disclosed system 10 and method. The animal 60 is driven into the net 16 by a handler using the flushing device 46. Once in the net 16, the animal 60 will become entrapped and unable to move. The net 16 does not harm the animal 60. Once entrapped in the net 16, a handler can remove the animal 60 from the enclosure 36 into a safe habitat or, if the animal 60 is endangered, into the federally mandated location. The perimeter net system 12 and trapping net system 14 can then be uninstalled.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method of relocating birds within a structure, the method comprising:
   installing a bird relocation system, the bird relocation system comprising;
   at least one perimeter net,
   at least one trapping net, and
   at least one flushing device;
   wherein a top edge of either or both of the at least one perimeter net and at least one trapping net is positioned at or near a ceiling of the structure, and
   flushing the animal through the structure wherein the flushing device chases the bird toward the at least one perimeter net and into the perimeter net or the trapping net.

2. The method of claim 1, wherein the at least one perimeter net is installed such that one side of the at least one perimeter net is proximal to one side of the structure.

3. The method of claim 1, wherein the at least one perimeter net is installed such that one side of the at least one perimeter net is substantially in contact with one side of the structure.

4. The method of claim 1, wherein the at least one perimeter net and at least one trapping net are mist nets.

5. The method of claim 1, wherein either or both of the at least one perimeter net and at least one trapping net are attached to at least one telescoping pole.

6. The method of claim 5, wherein the at least one telescoping pole comprises a means of attachment to a rafter or beam proximal to the ceiling of the structure.

7. The method of claim 6, wherein the means of attachment comprises a hook.

8. The method of claim 5, wherein the at least one telescoping pole comprises a first end and second end; a removable connector; a rope and pulley; and a cleat, and wherein the first end comprises a hook.

9. The method of claim 1, wherein the bird relocation system comprises at least two perimeter nets.

10. The method of claim 1, wherein the bird relocation system comprises at least two trapping nets.

11. A bird relocation system for relocating a bird in a structure, the system comprising:
    at least one perimeter net;
    at least one trapping net;
    at least one flushing device, and
    at least one telescoping pole,
    wherein either or both of the at least one perimeter net and the at least one trapping net are attached to at least one telescoping pole.

12. The system of claim 11, wherein the at least one perimeter net and the at least one trapping net are mist nets.

13. The system of claim 11, wherein the at least one telescoping pole comprises a means of attachment to a rafter or beam proximal to the ceiling of the structure.

14. The system of claim 11, wherein the at least one telescoping pole comprises a first end and second end, a removable connector, a rope and pulley; and a cleat, and wherein the first end comprises a hook.

15. The system of claim 11, wherein the bird relocation system comprises at least two perimeter nets.

16. The system of claim 11, wherein the bird relocation system comprises at least two trapping nets.

17. A method of relocating birds within a structure, the method comprising:
    installing a bird relocation system, the bird relocation system comprising;
    at least one perimeter net, and
    at least one flushing device;
    wherein a top edge of the at least one perimeter net is positioned at or near a ceiling of the structure, and
    flushing the animal through the structure wherein the flushing device chases the bird toward the at least one perimeter net,
    wherein the at least one perimeter net is installed such that one side of the at least one perimeter net is proximal to one side of the structure.

* * * * *